Figure 1:
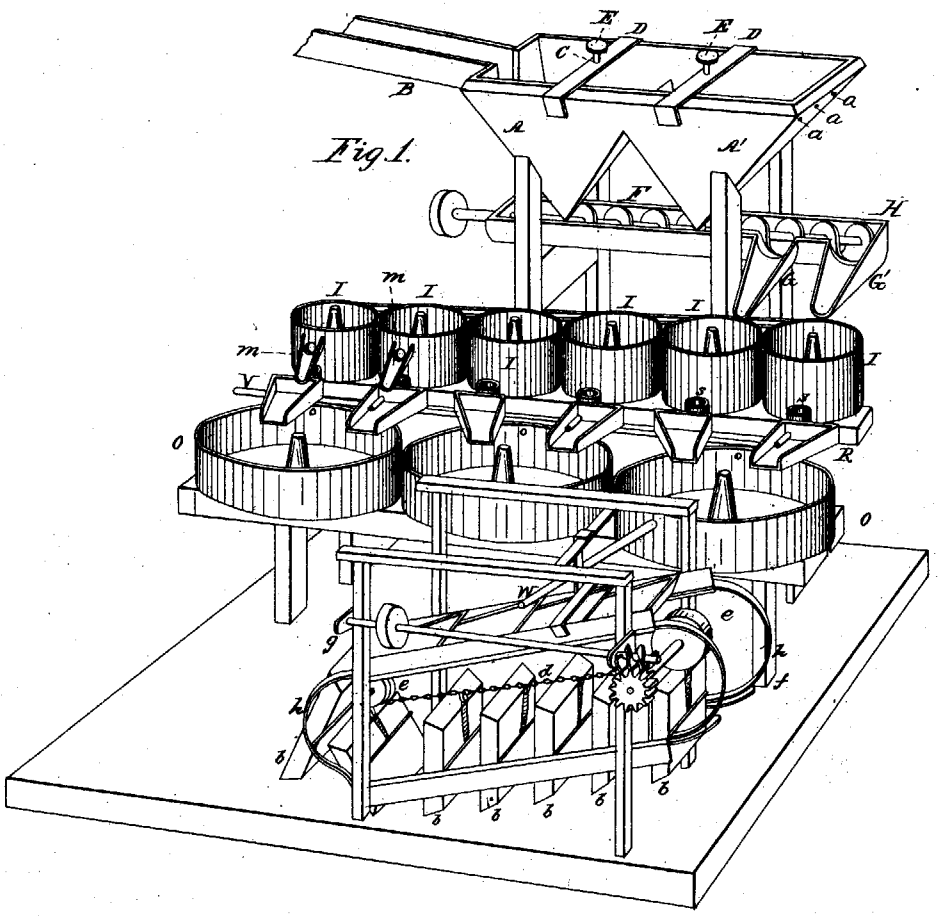

3 Sheets—Sheet 1.

M. P. BOSS.

APPARATUS FOR AMALGAMATING ORES.

No. 10,549. Reissued Jan. 13, 1885.

Witnesses:
W. C. Jordinston.
Fred F. Church.

Inventor:
Martin P. Boss
by
Melville Church

N. PETERS, Photo-Lithographer, Washington, D. C.

3 Sheets—Sheet 2.
M. P. BOSS.
APPARATUS FOR AMALGAMATING ORES.
No. 10,549. Reissued Jan. 13, 1885.
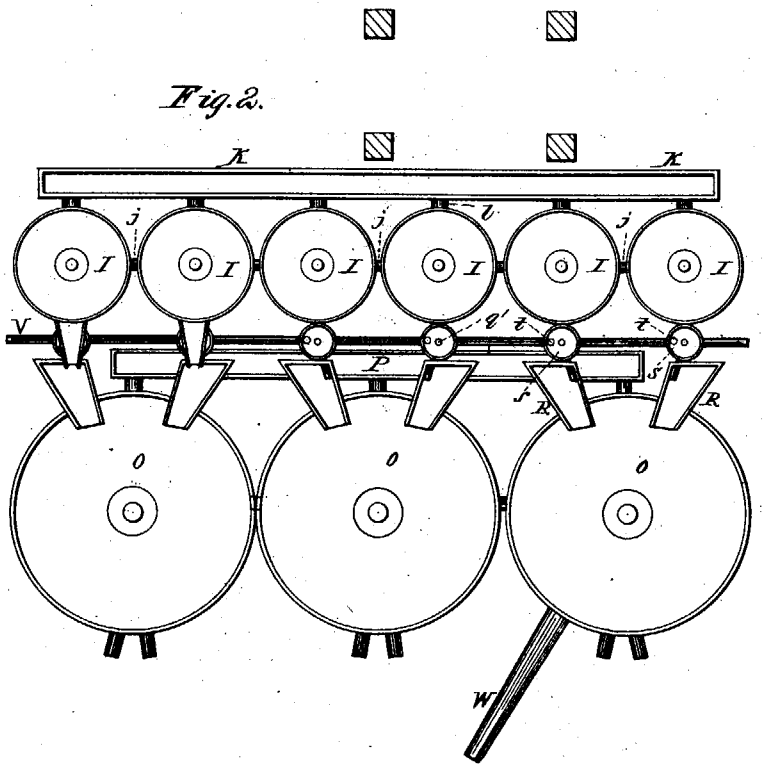
Witnesses:
W. C. Jordinston
Fred F. Church.
Inventor:
Martin P. Boss.
by
C. Mellville Clark
his Attorney
N. PETERS, Photo-Lithographer, Washington, D. C.

M. P. BOSS. 3 Sheets—Sheet 3.
APPARATUS FOR AMALGAMATING ORES.
No. 10,549. Reissued Jan. 13, 1885.
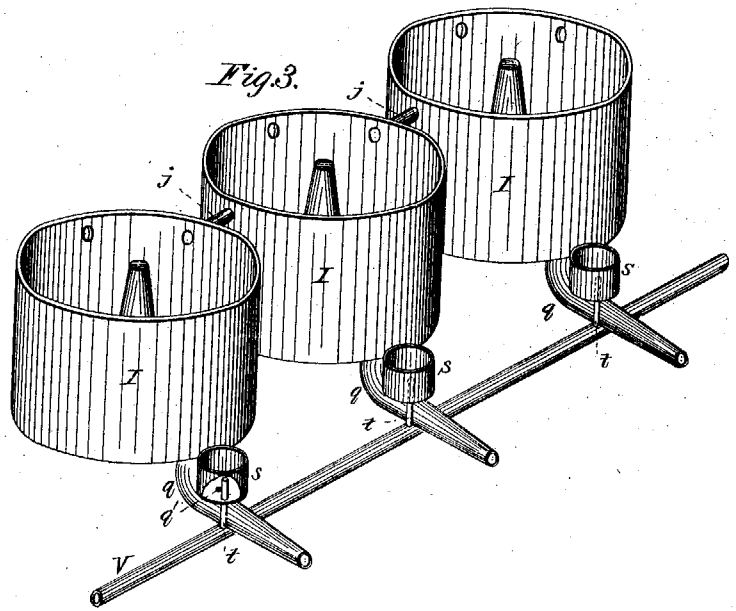
Witnesses:
W. C. Jirdinston
Fred E. Church
Inventor:
Martin P. Boss
by
Melville Church
his atty.
N. PETERS, Photo-Lithographer, Washington, D. C.

UNITED STATES PATENT OFFICE.

MARTIN P. BOSS, OF OAKLAND, CALIFORNIA.

APPARATUS FOR AMALGAMATING ORES.

SPECIFICATION forming part of Reissued Letters Patent No. 10,549, dated January 13, 1885.

Original No. 248,568, dated October 25, 1881. Application for reissue filed August 14, 1883.

*To all whom it may concern:*

Be it known that I, MARTIN P. BOSS, of Oakland, Alameda county, State of California, have invented an Improved Apparatus for Amalgamating Ores; and I do hereby declare that the following is a full, clear, and exact description thereof, reference being had to the accompanying drawings.

The main idea embodied in my invention is the amalgamation of the precious metals contained in ore pulp by maintaining a circulation of mercury and pulp at one and the same time in such a manner that the mercury is filtered or leached through the pulp and drawn off through one source, while the pulp passes, by means of other channels, through other tanks for similar or different treatment.

Having devised appropriate apparatus for accomplishing this object, I find that said apparatus can be used in a more extended way for treating the pulp. In fact, the arrangement is such that one or more processes can be carried on at the same time, and the circulation extended or restricted to a greater or less number of pans, thus giving the operator complete control over the pulp, all as hereinafter more fully described.

Referring to the accompanying drawings, Figure 1 represents a perspective view of my apparatus. Fig. 2 is a top view of the pans and troughs. Fig. 3 is a detail view of the pans and quicksilver-cups.

The apparatus I arrange on benches in the usual way. On the upper bench I mount two or more hoppers, A A′, which are connected together so that the pulp which is admitted to one will overflow into the other. The pulp is introduced into the hopper A through a trough, B, and when this hopper is filled to the height of the dividing-partition it overflows into the hopper A′. This latter hopper has also an overflow through the holes *a a* in its side, which are at about the same height as the top of the dividing-partition. The discharge or outlet through the lower end of each hopper is regulated by a cone-shaped plug formed on the end of a screw-rod, C, which passes through a cross-bar, D, and has a hand-wheel, E, at its top, so that by elevating the plug the size of the hole is increased. A trough, F, passes along below the discharge-passages of the hoppers, and extends out to one side, where two inclined spouts, G G′, lead from it. A conveyer-screw, H, is placed in this trough, and is rotated by power applied to a pulley on its end, so that the pulp is fed along by the screw.

On the next bench below a number of pans, I I I, are placed side by side, the two adjoining pans at the right-hand end of the series being placed so as to receive the pulp from the spouts G G′. These pans are all placed close together, and communication is established from one to another by means of openings *j* near their upper edges, so that they will overflow into each other. An inclined trough, K, extends along outside the entire series near the top of the pans, and each pan has an opening, *l*, leading from it into the trough at about the same level as the openings *j*. The two adjoining pans at the left-hand end of the series have each an overflow-opening and spout, *m*, which discharges the pulp into a lower series of pans, hereinafter described. It will now be noticed that each pan has two overflow-openings—one connecting it with the adjoining pan and the other with the trough K, which connects the entire series—so that by plugging up the openings in either pan it is cut out of the circulation without interfering with the operation of the remaining pans. The object of having two receiving and two discharge pans at each end of the series is to enable the feed to be shifted into one or the other, as desired, in case one should become clogged or require repairs. A gate (not shown) will therefore be placed across the trough K it is desired to close.

On the next lower bench one or more larger pans, O O O, are placed. These pans are connected so as to overflow into each other in the same manner that the upper series of pans are connected, and a trough, P, connects their side overflows in the same way.

Each pan I has a discharge-tube, *q*, Fig. 3, connecting with its bottom, which leads into a spout, R, and the spouts of each two adjoining pans I empty into the same pan O, as shown. A quicksilver-cup, *s*, is placed on each discharge-tube *q*, into which the quicksilver will rise with the level of that in the pan through the orifice *q'* when the end of the tube is plugged. Inside of each cup is a short tube, *t*, Figs. 2 and 3, the lower end of which connects with a main tube, V, which extends along under the entire number of cups. The upper end of the tube *t* does not extend to the top of the cup, so that the quicksilver will overflow into the upper end of the tube and be conducted into the main pipe V. This main pipe I will connect with a quicksilver-pump, by which the quicksilver will be raised and introduced into either or all of the pans, as desired, so as to produce a continuous circulation of the quicksilver. I have not deemed it necessary to illustrate this pump. Any one capable of performing the operation can be used, the object being merely to take the quicksilver from a low level and restore it to a higher level. Any mechanism capable of effecting this object can be used with satisfactory results.

The process will then be as follows: The pulp being first introduced into the hopper A, the heavier part settles and the lighter part overflows into the hopper A', the lighter part of the latter portion running off through the holes *a a*. The cone-plug being properly regulated, the pulp falls into the trough F, and is conveyed by the screw H to the spout G, down which it passes into the pan I. It then overflows from pan to pan until all are filled, the current being strong enough to prevent it from settling. In one or more of these pans I supply a constant stream of mercury, which filters through the pulp, amalgamating the metals, and passing down rises in the quicksilver-cup until it overflows into the circulating-pipe; thence it is drawn by a pump in the usual way and introduced into the pan or pans again, thus giving a continuous circulation of mercury through the pulp and keeping the mercury in good condition. By this means I amalgamate the particles so that they will either be saved in the amalgam or caught in the concentrator, through which the pulp is finally passed.

The quicksilver used in the process will sink on all occasions, by reason of its great relative weight, and will find its way into the pipe V ultimately, where it is submitted to the action of the pump, or is otherwise elevated and restored to the pans containing the pulp.

If desired, one or more of the pans can be cut out of the circuit after they are filled by plugging the passages, as above described, and the pulp contained in them treated chemically; or chemicals can be introduced into some of the pans and mercury in others, as the operator desires. After passing into the lower settlers or large pans, O, where the heavier particles are settled, the pulp is conducted by a spout, W, from the terminal pan upon a concentrator, which will form the subject-matter of a separate application for patent. The central posts or axes in the pans are to support the mullers.

The pans I and settlers O are all of them the kinds of pans that are in ordinary use. Each series of pans and settlers stands upon nearly or quite the same level, and each runs full or nearly full of pulp, so as to furnish time and opportunity for the precious metals to amalgamate with the quicksilver and separate from the worthless mass of the pulp. By this apparatus the pulp is constantly fed into the first one or two pans, and is constantly passing through the series of pans and settlers, being reduced as it goes along, and the waste mass of the pulp is constantly discharged from the last large pan or settler O. This continuous movement of the pulp while being reduced in pans and settlers, or settling-pans, has never before been successfully accomplished.

I am aware that it has been heretofore proposed to connect a series of vessels in such manner as to discharge into each other by overflow, and also to arrange a number of amalgamating-pans at different levels, and discharging by bottom outlets into each other. I am not aware, however, that it has ever been proposed, prior to my invention, to arrange two different series of vessels, one discharging the functions of an amalgamator, and connected together by overflow-pipes in such manner as to maintain a constant equal circulation of the pulp therein, and the other connected in like manner and of greater size, so as to retard the current and permit a settling impossible to secure if the vessels were of the same size as those of the first series.

Having thus described my invention, what I claim, and desire to secure by Letters Patent, is—

1. The combination, with the hoppers A A', and the trough F, having the feeding-screw H, and the right-angled arranged spouts G G', of the series of pans I, connected together by pipes *j*, and having a common trough, K, connected thereto by pipes *l*, substantially as and for the purpose set forth.

2. The pan I, having the discharge-pipe *q*, provided with an orifice, *q'*, in combination with the cup *s*, having an overflow-tube, *t*, reaching down through its bottom and emptying into the trough or pipe V, substantially as and for the purpose set forth.

3. An apparatus for treating ore pulp, consisting of the hoppers A A', trough F, with its conveyer-screw H, and spouts G G', the connecting series of pans I, with their overflows *j l*, and trough K, and having the discharge-tubes *q*, the quicksilver-cups *s*, with the overflow-pipes *t*, and the main pipe V, and the lower set of settling-pans, O, connected by overflows, as described, all combined and arranged to operate substantially as above specified.

4. The combination of the series of pans I, connected together by overflow-pipes *j*, and the settling or separating series of larger pans O, also connected together by overflow-pipes, with a discharging-viaduct connecting the terminal pans of the first series with the primary pan of the second series, whereby a continuous circulation of the pulp from pan to pan is secured until it is thoroughly reduced, and finally discharged from the last large pan or settler as waste tailings, substantially as shown and described.

MARTIN P. BOSS.

Witnesses:

M. A. WHEATON,

D. J. OSBORNE.